United States Patent
Leard et al.

(10) Patent No.: US 12,076,916 B2
(45) Date of Patent: Sep. 3, 2024

(54) RESONANCE BASED LIGHT VALVE SYSTEM

(71) Applicant: Seurat Technologies, Inc., Wilmington, MA (US)

(72) Inventors: Francis L. Leard, Sudbury, MA (US); James A. DeMuth, Woburn, MA (US); Andrew J. Bayramian, Marblehead, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 189 days.

(21) Appl. No.: 17/513,402

(22) Filed: Oct. 28, 2021

(65) Prior Publication Data

US 2022/0134643 A1 May 5, 2022

Related U.S. Application Data

(60) Provisional application No. 63/107,303, filed on Oct. 29, 2020.

(51) Int. Cl.
| | |
|---|---|
| *B22F 12/44* | (2021.01) |
| *B22F 10/20* | (2021.01) |
| *B29C 64/153* | (2017.01) |
| *B29C 64/268* | (2017.01) |
| *B29C 64/286* | (2017.01) |
| *B33Y 30/00* | (2015.01) |

(52) U.S. Cl.
CPC .......... *B29C 64/153* (2017.08); *B22F 10/20* (2021.01); *B22F 12/44* (2021.01); *B29C 64/268* (2017.08); *B29C 64/286* (2017.08); *B33Y 30/00* (2014.12)

(58) Field of Classification Search
CPC ...... H01S 5/0085; H01S 3/0085; B22F 12/44; B29C 64/286
See application file for complete search history.

(56) References Cited

U.S. PATENT DOCUMENTS

| | | | | |
|---|---|---|---|---|
| 5,168,383 | A * | 12/1992 | Iwaki | G02F 1/133553 359/260 |
| 6,384,953 | B1 * | 5/2002 | Russell | G01J 3/26 359/254 |
| 2017/0232557 | A1 * | 8/2017 | DeMuth | B33Y 50/02 148/525 |
| 2019/0291210 | A1 | 9/2019 | Elhadj et al. | |

OTHER PUBLICATIONS

Caldwell, Martin E et al. "Surface-plasmon spatial light modulators based on liquid crystal." Applied Optics, vol. 31, No. 20, Jul. 10, 1992, pp. 3880-3890.

Wang, Qian et al. "Optically reconfigurable metasurfaces and photonic devices based on phase change materials." Nature Photonics, vol. 10, Jan. 2016, pp. 60-65.

* cited by examiner

*Primary Examiner* — Michael Carter
(74) *Attorney, Agent, or Firm* — David R. Stevens; Stevens Law Group

(57) ABSTRACT

An additive manufacturing system includes a high power laser to form a high fluence laser beam at a first wavelength. The systems includes a 2D patternable light valve having a resonance based structure responsive to a write beam.

10 Claims, 19 Drawing Sheets

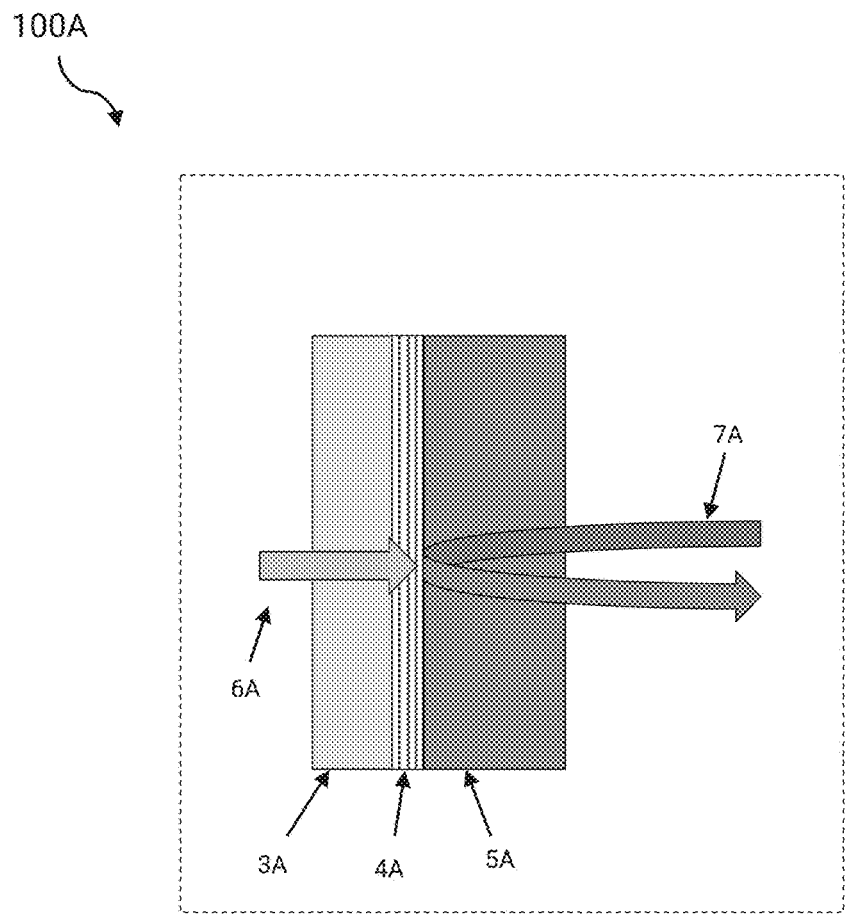
Fig. 1A(i)
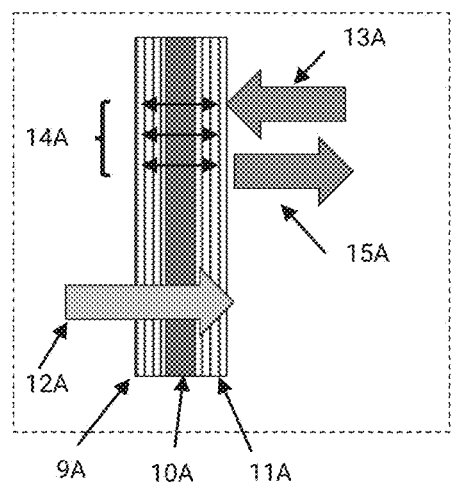
Fig. 1A(ii)

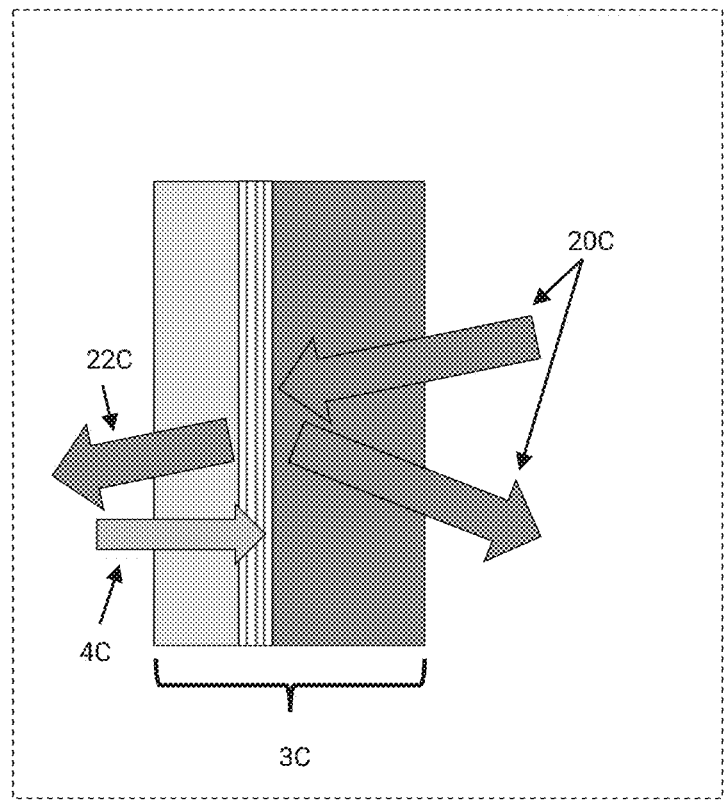
Fig. 1C(i)
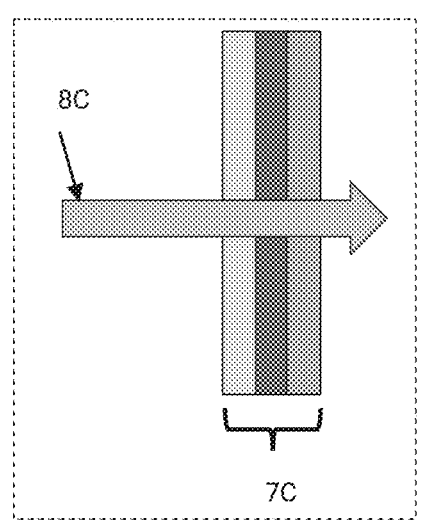
Fig. 1C(ii)

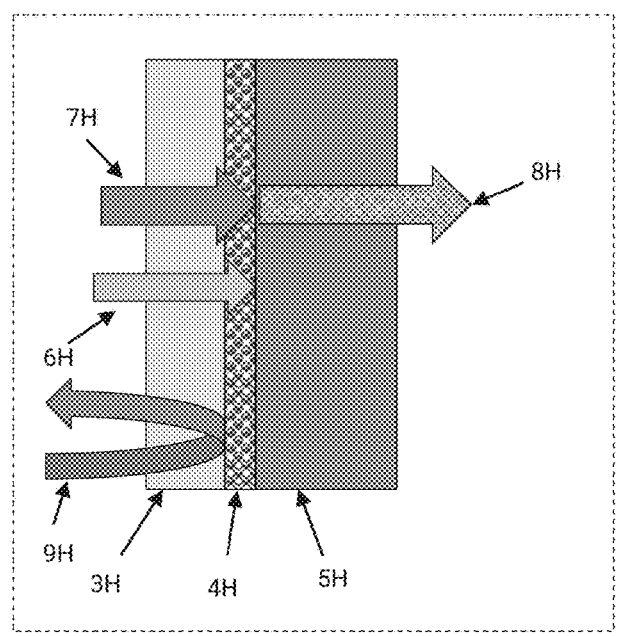
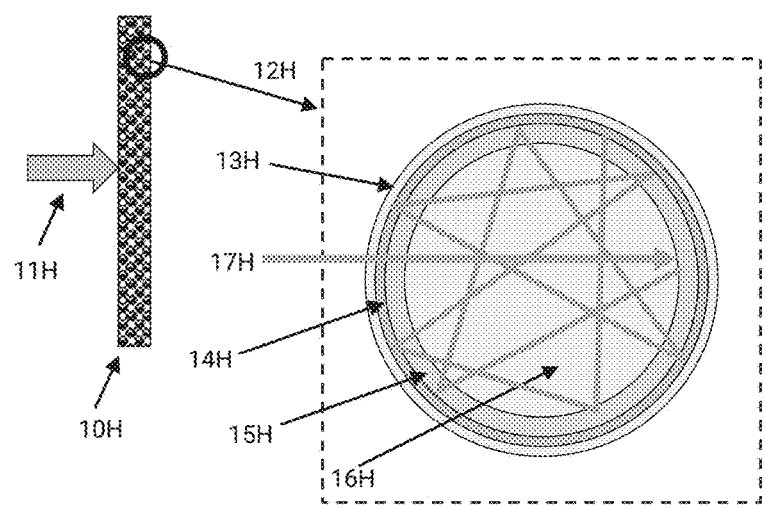
Fig. 1H

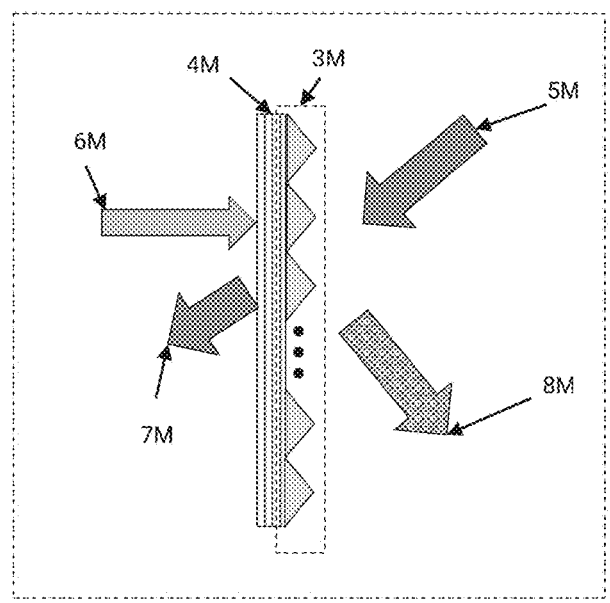
Fig. 1M(i)
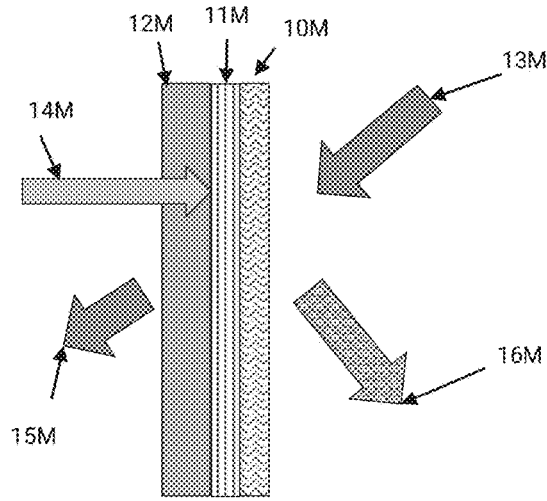
Fig. 1M(ii)

RESONANCE BASED LIGHT VALVE SYSTEM

RELATED APPLICATION

The present disclosure is part of a non-provisional patent application claiming the priority benefit of U.S. Patent Application No. 63/107,303, filed on Oct. 29, 2020, which is incorporated by reference in its entirety.

TECHNICAL FIELD

The present disclosure generally relates to operation light valve systems that include resonance based control structures. More particularly, use of resonance based control structures that used low power write beams to create transmissive or reflective patterning for high fluence beams.

BACKGROUND

High power laser systems with light able to operate at high fluence for long durations are useful for additive manufacturing and other applications that can benefit from use of patterned high energy lasers.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1A(i) and (ii) illustrates a resonance based light valve;

FIG. 1C(i) and (ii) illustrates a lambda magic mirror for a resonance based light valve;

FIG. 1H illustrates a quantum dot resonance based light valve;

FIGS. 1M(i) and 1M(ii) illustrates other embodiments of total internal reflectance resonance based light valves;

FIG. 1O illustrates other embodiments of a metamaterial resonance based light valve;

DETAILED DESCRIPTION

Figure 1B:
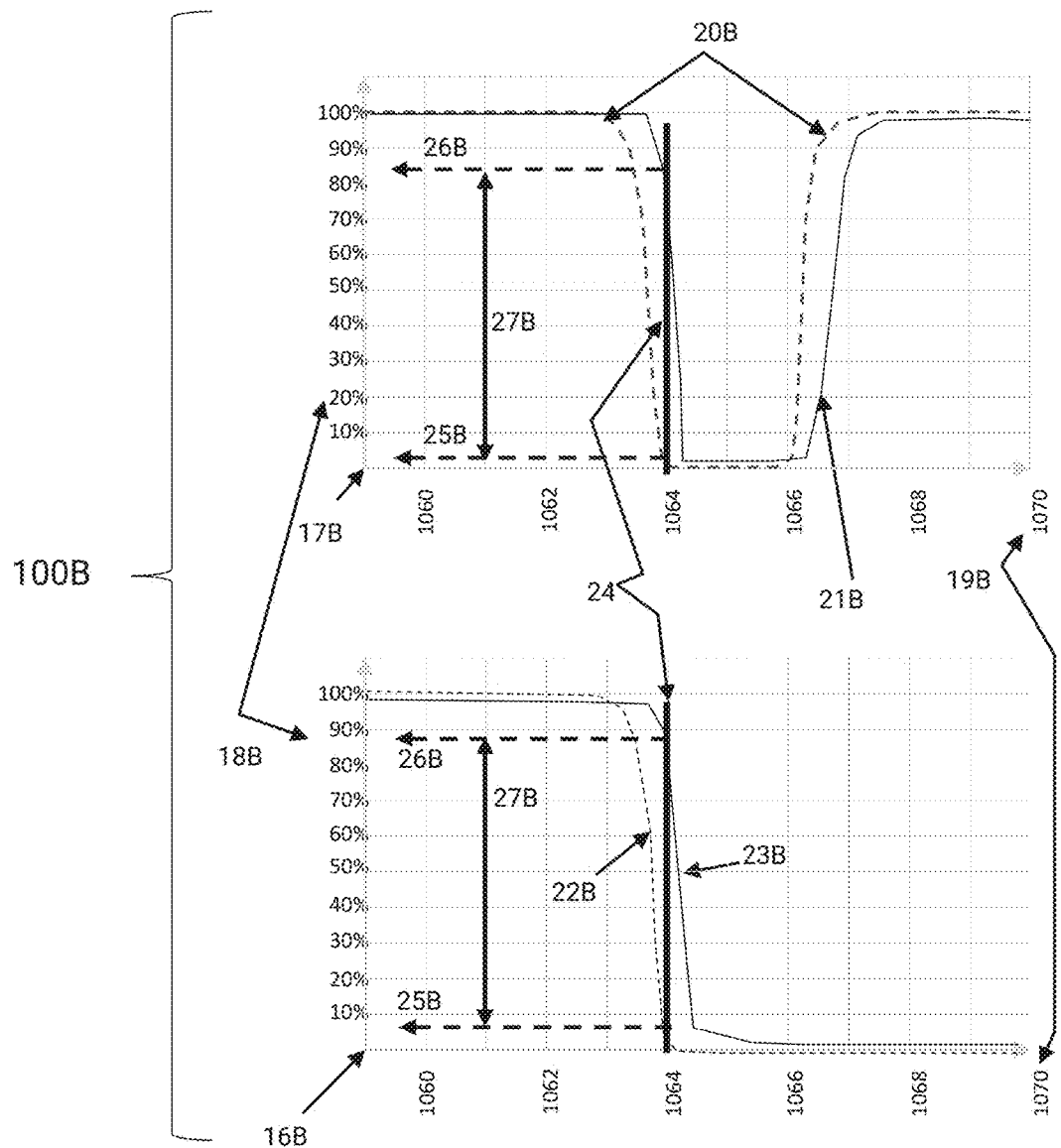
FIG. 1B illustrates graphs depicting reflection or transmission response in a resonance based light valve.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, an additive manufacturing system includes a high power laser to form a high fluence laser beam at a first wavelength. The systems includes a 2D patternable light valve having a resonance based structure responsive to a write beam.

In some embodiments, the resonance based structure includes a lambda magic mirror.

In some embodiments, the resonance based structure includes a phased array lambda magic mirror.

In some embodiments, the resonance based structure includes a lambda magic mirror with an electro-optically activated control structure.

In some embodiments, the resonance based structure includes a lambda magic mirror with an electrically activated control structure.

In some embodiments, the resonance based structure includes quantum dot materials.

In some embodiments, the resonance based structure includes total internal reflectance structures.

In some embodiments, the resonance based structure includes quantum dot materials.

In some embodiments, the resonance based structure includes metamaterials.

Light valve (LV) technology is limited in ability to switch pixel speeds due to its reliance on photoconductors and liquid crystal materials. Current devices make use of group phenomena (e.g. accumulation of charge across a photoconductor or the accumulation of polarization retardation across a liquid crystal cell). By using resonance based light valves, in which the material is structured to couple well with the activating field (write beam) or to the high fluence beam, the physical volume of the activating material can be made miniscule in comparison, and its inductance made similarly small. Additionally, the activating material can be made of a higher purity with much lower potential for defects to drastically reduce defect driven damage from the high fluence beam. Also, additional functionality such as scanning, which requires complex system level coupling of different LV technologies using standard methods, can be instead replaced using single and simple resonance-based LVs. The added functionality afforded by resonance-based LVs includes of simple amplitude, complex single beam, structured multiple beam and/or full holographic beam scanning.

FIG. 1A(i) illustrates a resonance-based light valve (RbLV) 100A. A support substrate 3A on which a resonator 4A is deposited or attached with a second support substrate 5A forming a cap structure to the resonator 4A. A patterned low fluence beam 6A at λ1 enters the resonance based light valve 100A and interacts with a control structure within the resonator 4A. The resonator is structured so to resonant at the high fluence beam 7A at λ1. In more detail in FIG. 1A(ii), one or more multi-layer stacks (two are shown here, 9A and 11A with one or more control structure(s) 10A arranged in between the multi-layer stack structures. The control structure 10A responds to the write beam 12A at λ1 by a change in its complex refractive index. This index changes modifies the resonance of the filter (composed of 9A, 10A, and 11A) which shifts it from being transmissive to the high fluence beam to being reflective (for a transmissive based RbLV) or from being reflective to being transmissive (for a reflective based RbLV). The high fluence beam 13A at λ2 enters the RbLV and undergoes multiple reflections inside the resonator 4A, each pass through the resonator builds the high fluence response 14A to this structure so that the outcome is a reflection function 15A that is dependent on the write beam action on the control layer.

The control structure 10A in the resonator can be composed of many different materials and its activation base on different phenomena. The phenomena that allows the control structure 10A to change its refractive index can be (but not limited to) thermo-optic (material heats up as a response to write beam at λ1 but is not absorptive to λ2), electro-optic (material is activated by a field stimuli and its index is modified by but not λ2), phase change (material undergoes a phase change from crystalline to amorphous as a function of only λ1), or polar birefringence (material's birefringence is modified by write beam's wavelength and polarization state at λ1 and does not respond to λ2) as a few examples.

FIG. 1B illustrates graphs 100B depicting respective reflection or transmission response in a RbLV. There are two modes that a resonant structure can be designed to, either an edge response 16B or a notch response 17B. The graphs can be depicted as a reflection response or a transmission response, here it is represented as a reflection response with the normalized reflection response 18B being shown as a function of wavelength 19 of the high fluence beam. The normal reflection response for the notch type of resonator stack is shown as 20B in graph 17B; this is the case when the write beam is absent (the converse can be designed as well). When the write beam is activated, it interacts with the control structure and causes a change in its (control structure) refractive index which causes a shift in the resonator's response seen in 21B. Likewise, in an edge band response 16B, the normal response in the absence of the write beam is represented by 22B while with the write beam activated is represented by a shift in the resonator response to 23B. The high fluence beam's wavelength is represented by 24B while its response to the inactivation and activation of the write beam is represented by 25B and 26B, respectively. The change in the high fluence beam's response as a function of the write beam is 27B.

FIG. 1C(i) and (ii) illustrates a lambda magic mirror (LMM) for a resonance based light valve 100C. In one embodiment shown in FIG. 1C(i) a low fluence write beam 4C at λ1 enters the LMM and modifies the control structure's refractive index that is incorporated into the reflective notch multi-layer structure. When the write beam is not present, the LMM can be designed so that the high fluence beam interacts with the resonator producing a high reflective response for the high fluence beam 20C. When the write beam is absent, the resonator has a shifted response to the high fluence beam turning a high reflective function into a high transmission function and the LMM becomes transmissive to the high fluence beam 22C. The converse actions can be designed in the LMM as well. FIG. 1C(ii) shows in more detail a resonator layer 7C structure and a patterned write beam 8C. The control structure within the resonator layer is composed of a material that absorbs readily at the write beam wavelength λ1 but has no to little absorption at the high fluence wavelength λ2. Examples of suitable materials that would work in LMM include Zinc Selenide, Zinc Sulfide, Silicon, and Strontium Barium Niobate.

Figure 1D:
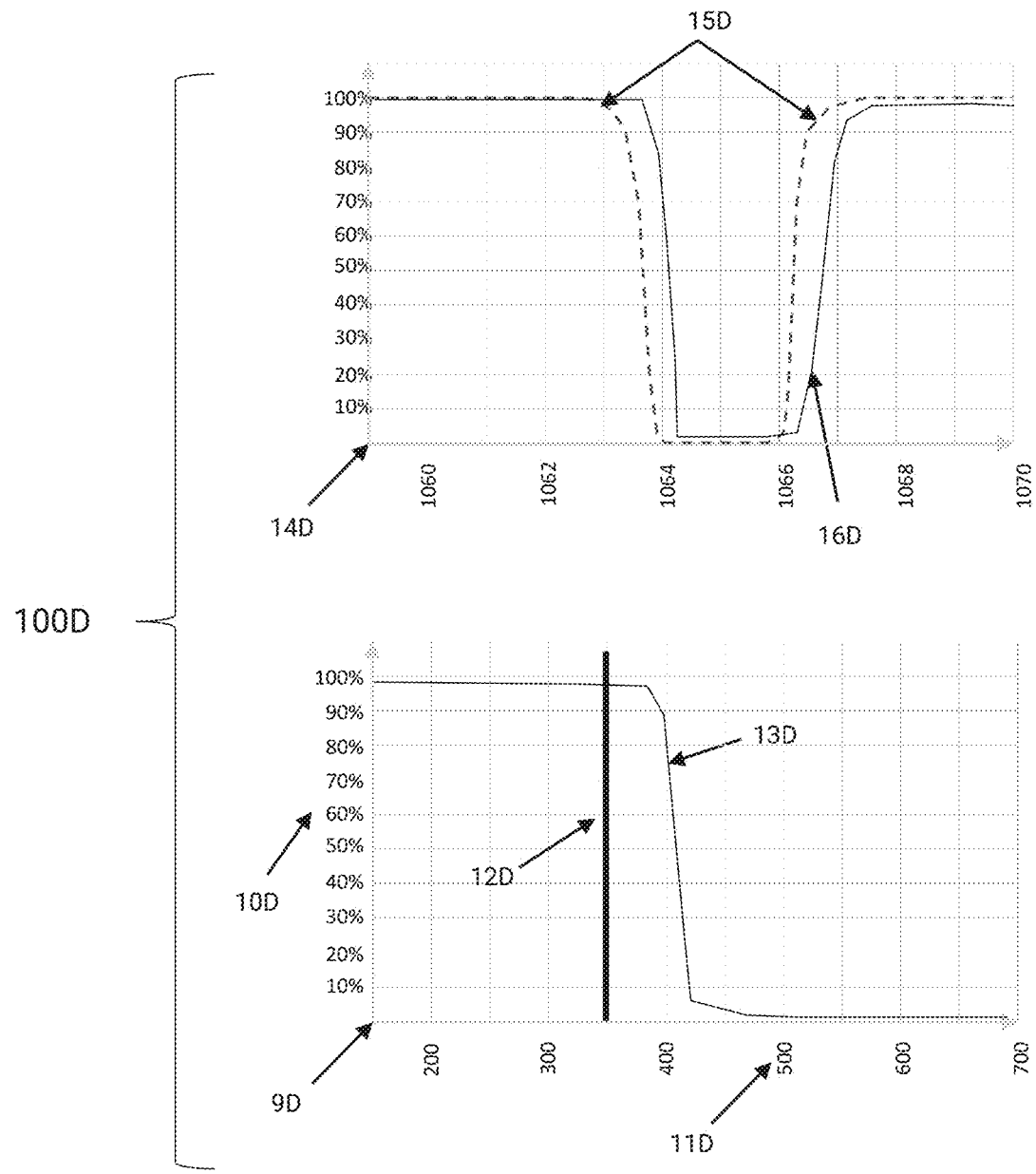
FIG. 1D illustrates graphs depicting reflection or transmission response in a lambda magic mirror resonance based light valve.

FIG. 1D illustrates two graphs 100D depicting respective reflection or transmission response in a lambda magic mirror resonance based light valve. An exemplary absorption curve for this material is represented by 9D where 10D is the percentage absorbed by unit of length (typically per micron) as a function of the write beam's wavelength 11D, in nanometers). The write beam's wavelength is depicted as 12D on the control structure absorption curve 13D. The high fluence beam response to the LMM is shown in 14D with the response when the write beam is inactivated and activated 15D and 16D, respectively. The LMM represents a thermo-optic control over the control structure index by the write beam and its affection on the control structure's index causes the resonator to shift its response with direct application of the write beam's intensity. In some embodiments, by applying a low level of unpatterned write beam fluence, the resonance 'simmers' just below a switching threshold so that a small write signal will activate the wavelength shift; this functionality allows for quicker switching time while preventing pixel spreading.

Figure 1E:
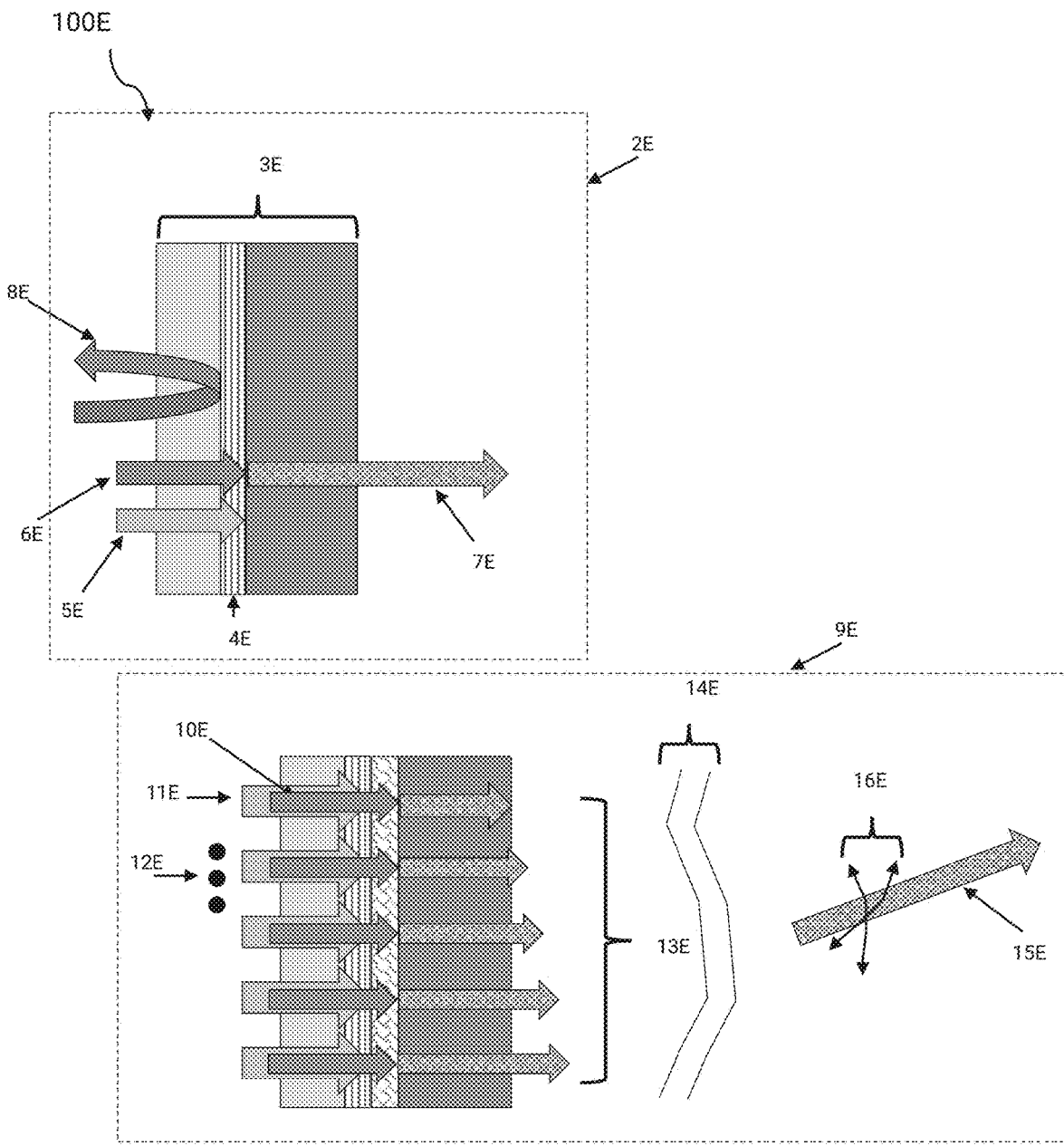
FIG. 1E illustrates a phased array lambda magic mirror control structure.

FIG. 1E illustrates a phased array lambda magic mirror control structure 100E with a LMM structured to be a phased array for high fluence beam non-mechanical beam steering. In a first embodiment 2E the LMM is used as a phased array for beam steering. In a second embodiment the LMM includes a phased delay layer 4E. A gray scale patterned write beam 5E at wavelength λ1 enters the LMM phased array structure and affects the refractive index of the control layer within the resonator. An unpatterned high fluence and high coherence beam 6E at wavelength λ2 also enters the LMM and interacts with the resonator being controlled by the write beam. Where the write beam is activated and affecting the control structure, the high fluence beam undergoes phase delay across the affected area of the LMM and undergoes patterned phase delay across the LMM. The coherent phasing imparted by the resonator (dictated by the gray scale patterning of the write beam) allows the outgoing high fluence beam 7E to be steered with respect to one when the write beam contains no gray scale quality nor when the high fluence beam has high coherency. In the areas where the write beam is not activated or where the high fluence beam's coherency has been reduced (up-steam control of its coherency), the LMM acts as reflector for the high fluence beam and its energy is reflected away 8E. While this depiction of the phased array LMM is shown in transmission when activated, the converse can also be designed.

Embodiment 9E shows in detail of the phasing of the LMM embodiment 2E. A typical high fluence and high coherency beam 10E arrives at same location as that of the write beam 11E. Likewise, across the LMM, a plethora 12E of paired high fluence and write beams enter the phased array LMM. The write beams are patterned and have gray scale intensity levels while the high fluence beams has equally high coherency and have a null phase relationship with each other. The write beams interact with the control structure and impart varying modification to the control structure's refractive index dependent on the intensity level of each write beam. The high fluence beam interacts with the resonator and each beam acquires a certain amount of phase retardation or advancement depending on the write beam intensity. Upon leaving the LMM phased array, the ensemble of high fluence beams 13E now have a phase relationship with each other. After an amount of propagation 14E, usually 5-10× the clear aperture of the ensemble), the phased response becomes evident and the high fluence beam attains a directionality 15E that is the phasor addition of the exiting ensemble. By modifying the spatially and gray scale pattern of the write beam, the beam can be non-mechanically steered across a range of angles 16E dictated by the maximum refractive index change of the control media by the write beam and the resonator's quality function. The high fluence output from this type of phased array contains no gray scale on its intensity.

Figure 1F:
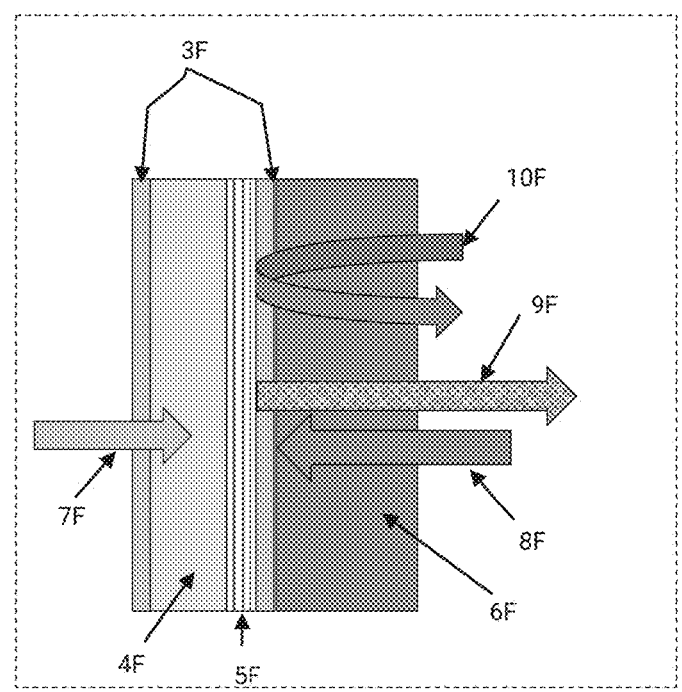
FIG. 1F illustrates a lambda magic mirror electro-optically activated control structure.

FIG. 1F illustrates a lambda magic mirror electro-optically activated control structure 100F. The electro-optical activated control structure 100F contains exemplary TCO 3F layers which can be constructed to impose electrical (in this case), magnetic, or acoustic activation of the pertinent control layer in the resonator. The field enhancement would allow the write beam to easily manipulate the complex refractive index of the control layer, while not being affected by the high fluence beam. In this example, a photoconductor layer 4F responds to a patterned write beam 7F at λ1. The action of the write beam on the photoconductor allows for the field placed on the TCO layers to be transferred across the resonator structure 5F containing a field activated (EO in this case) material. Where the write beam is activated in its pattern, the field will be transferred to across the resonator and the buried EO material inside. The EO material changes is permittivity as a function of field strength with the refractive index of this layer dependent on its instantaneous permittivity and thus a shift in resonance. The resonator is designed react to the high fluence beam 8F at λ2 which enters this embodiment through the support substrate 6F. Wherever the write beam is activated, the EO material causes a change in the resonance of the LMM and shifts the resonance with respect to the high fluence beam; this action allows the high fluence beam to be patterned with the same pattern on the write beam as it interacts with the resonator and leaves as a patterned high fluence beam 9F. Where the write beam is not activated, there is now change to the LMM's response so that an unpatterned high fluence beam leaves with no patterning 10F with the write beam in the off or inactivated state.

The field enhancement layer can be made of a crystalline EO material, such Lithium Niobate (LiNbO3), Potassium dihydrogen phosphate (KDP), or Potassium dideuterium phosphate (KD*P), Rubidium Titanyl Phosphate (RTP), Lithium Triborate (LiB3O5, or LBO), Potassium Titanyl Phosphate (KTIOPO4 or KTP), Lithium Tantalite (LiTaO3 or LTO), magneto-optical material (such as CdMnTe, CdMnHgTe, TdGdG, or similar materials), acousto-optical materials (LiNbO3, fused silica, PZT, or similar materials), a field enhanced wavelength converter (high fluence beam at λ2 to high fluence beam at λ3), or a phase change material (such as single or polycrystalline ZnSe, ZnS, Si, poled liquid crystal or chalcogenides or similar material). In other embodiments, the EO materials are various types of Liquid Crystals (LC) such as thermotropic, lyotropic, mettalotropic.

In each type of LC, different phases (stable entropy states) can exist, such as Nematic, Cholesteric, Ferroelectric, Smetic, blue discotic, and conic. In still other embodiments materials such as Aluminum Zinc Oxide (AZO), Cadmium Sulfide (CdS), Cadmium Selenide (CdSe), Zinc Sulfide (ZnS), Zinc Selenide (ZnSe), Indium Sulfide (In2S3), Lead Sulfide (PbS), Cadmium Zinc Telluride (CdZTe), doped Germanium (n:Ge, p:Ge) amorphous Silicon (a-Si), doped Silicon (n:Si, p:Si), or Mercury Iodide (HgI2).

These materials can be in either bulk, grown as part of a deposition or epitaxial grown onto surfaces as part of the resonator creation. The general requirement in this application is that the material needs to be incorporated into a resonator (growth, deposition or lamination process), and be non-absorptive to the high fluence light (λ2 or λ3) while being responsive to the write beam (at λ1).

Figure 1G:
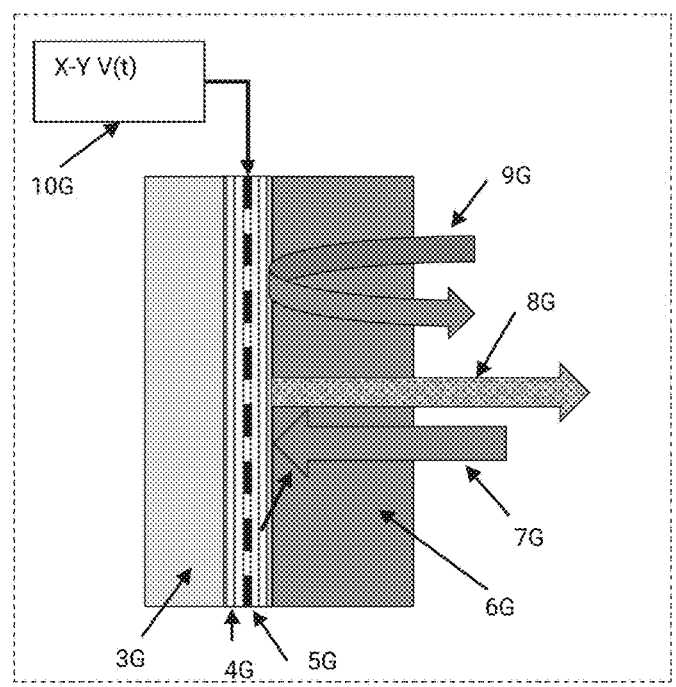
FIG. 1G illustrates a lambda magic mirror electrically activated control structure.

FIG. 1G illustrates a lambda magic mirror electrically activated control structure 100G. An embodiment of the LMM electrically activated control structure 100G is composed of an electrically controlled layer buried into the resonator. A top supporting substrate 3G and a bottom supporting substrate 6G sandwiches the resonator 4G containing an electrically activated control layer 5G. No patterned write beam is needed in this embodiment, instead the patterning is performed by properly activating the electrical matrix buried into the resonator by means of an external control circuit 10G. Resonance can be reflective in the off state and transmissive in the on state, and the converse can be equally designed. The electrically activated layer can be composed of a phase change material, a spin state material or any electro-active material that causes a change in the material permittivity on application of an electric field. This embodiment does require that the electrical interface does not have absorption in the high fluence beam wavelength range. Materials that have this attribute are sized so that minimal coupling occurs such as those found in nano-scale deposition (10-50 nm widths) metals, 2D nanosheets of semiconductor materials (ZnSe, AZO, or similar) exfoliated and optically attached semiconductor layers as a few examples.

FIG. 1H illustrates a quantum dot resonance based light valve (QDRLV) 100H. A QDRLV is composed of a top supporting substrate 3H, a quantum dot (QD) resonant layer 4H, and a bottom support substrate 5H. A patterned write beam 6H enters the QD layer where it interacts with the QDs and modifies the QDs resonate response to the unpatterned high fluence beam 7H. Aspects of the QDs are resonant with the write beam and other aspects are resonant with the high fluence beam. The resonance (different aspects) allows the small volume of the QDs to have a large effect on the high fluence beam via this resonance. In locations where the write beam is not present or activated, the QDs resonant response is not shifted and the high fluence beam is reflected with no patterning 9H. As before, the QDRLV is depicted here as being reflective in the off/inactivated write beam state, the converse can be equally designed. Exemplary detail of the QD layer is depicted in 10H while exemplary detail of a single QD is illustrated in 12H. A write beam 11H is incident on the QD layer while a small portion 17H of it is incident on the QD where the aggregate addition of all the write beamlets have the desired effect of interacting with a core of all the QDs in the layer and affecting the resonance for the high fluence beam (not shown).

A quantum dot can be sized so its volume is at a resonance with light. Enhancement to this resonance can be attained by coating the QD with a multi-layer stack, an example shown in 12H where the exemplary QD contains an outer coating layer 13H, this size of the overall QD with these coatings (in this example) is designed to be resonant with the high fluence beam at λ2 only when the write beam at λ1 is activated/present. Other layers can be added to the QD to enhance resonance to either or both wavelengths as well as being control layers as is the case by adding a control layer in 14H. This layer would interact with the write beam at λ1, causing the optical effective size of the QD particle to increase and thus not be resonant to the high fluence beam, in effect making the QD transparent to the high fluence beam when the write beam is activated or present. Since the core 16H of the QD is sized to be resonant with the write beam, this control layer undergoes repeated interaction with the write beam allowing for its small thickness layer to have an oversized effect on the high fluence beam. An interior coating layer 15H can be added to aid in the resonance to the high fluence beam as well as isolating any effects in the core from distorting the desired effect of it on the high fluence beam.

The QDs can be constructed of a wide variety of material with the requirement that core needs to have no absorption at the high fluence beam at wavelength λ2. It could be of low or high absorption to the write beam, depending on if the design requires the core or a cladding layer be the control structure that interacts with the write beam at wavelength λ1. In this case, the QD needs to be designed so that its core is resonant with λ1 while its overall dimension is resonant at λ2 at one of the write beam state (activated or not activated). Gray scale of the high fluence beam is possible by having gray scale on the write beam.

Figure 1I:
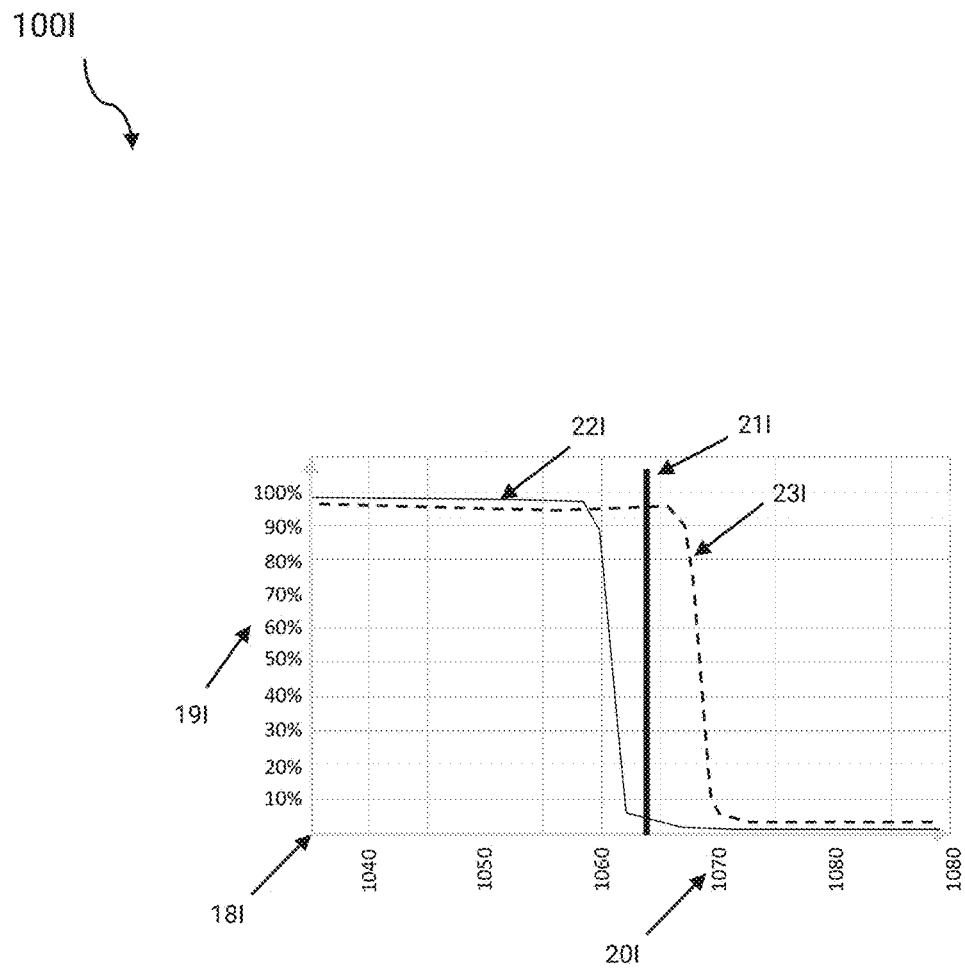
FIG. 1I illustrates a graphs depicting reflection or transmission response in a quantum dot resonance based light valve.

FIG. 1I illustrates a graph 18I depicting reflection or transmission response in a quantum dot resonance based light valve 100I. A response function for the QD by the high fluence beam is shown, with 19I being the transmission response of the QD and 20I the wavelength range occupied by the high fluence beam centered at λ2 21I. When the write beam is inactivated 22I, the QD interacts with the high fluence beam and causes the beam to be reflected or scattered. When the write beam is activated, its repeated interaction with the control layer causes a change in one or more or the QD's layers or its core causing its optical volume to be increase and move out of resonance with the high fluence beam rendering the QD invisible to this beam and allowing for its high transmission 23I. While design in this example is that for scattering/reflection for activation with the write beam, the converse can be equally designed with appropriate selection of materials and QD size.

Figure 1J:
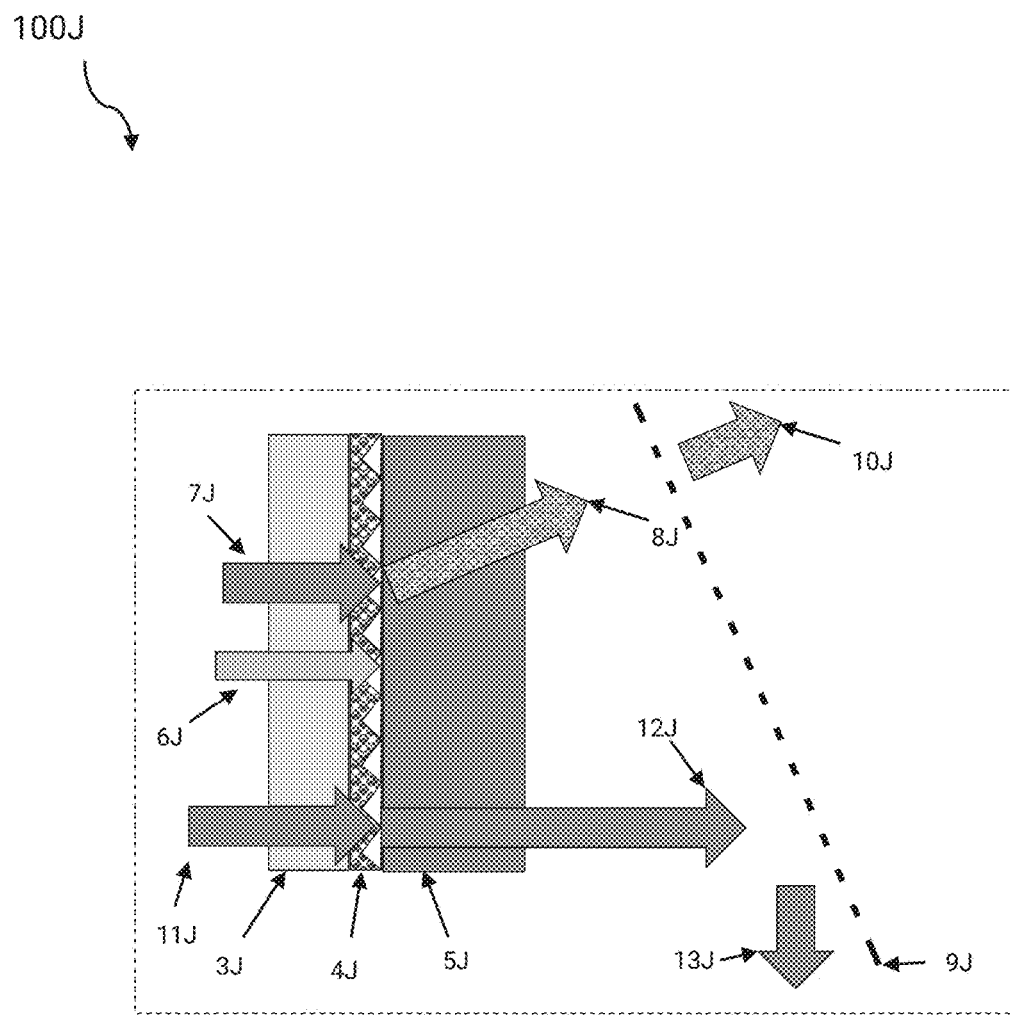
FIG. 1J illustrates a quantum dot resonance based controlled diffractive light valve.

FIG. 1J illustrates a quantum dot resonance based controlled diffractive light valve 100J. The QDR-controlled diffractive LV 100J has a top supporting substrate 3J and the bottom supportive substrate 5J sandwiches the QD layer 4J which is constructed into a diffractive grating that diffracts the high fluence beam 7J at λ2 where the write beam 6J at wavelength λ1 is activated. The diffracted high fluence beam 8J emits from the QDR-LV at an angle dictated by the grating period structure and the optical equivalent indices of the QDs when activated or inactivated by the write beam. The emitted high fluence light passes through a Schlieren optical system 9J in which a slotted reflective screen is used to control angled light transmission. The Schlieren system is set up to permit angled light to be transmitted 10J to the print bed and reject/reflect light 13J that passes unperturbed (un-deviated) through the diffractive structure. The latter would be the case when a high fluence beam 11J enters the QDR-LV where the write beam is inactivated and the QDs are not resonant with the beam so that the high fluence beam passes unperturbed through the diffractive layer 12J and reflects off the Schlieren system. Gray scale is afforded by the combination of controlling the diffracted light angle and the aperture system in the Schlieren system. The grating structure for the diffractive aspect of the QD layer can be constructed using surface gratings, volume gratings or holographically induced gratings by either removal of QDs from nanoscopic volumes or by modifying the cores of each QD if the cores are composed of an electro-optic or phase bleachable material.

Figure 1K:
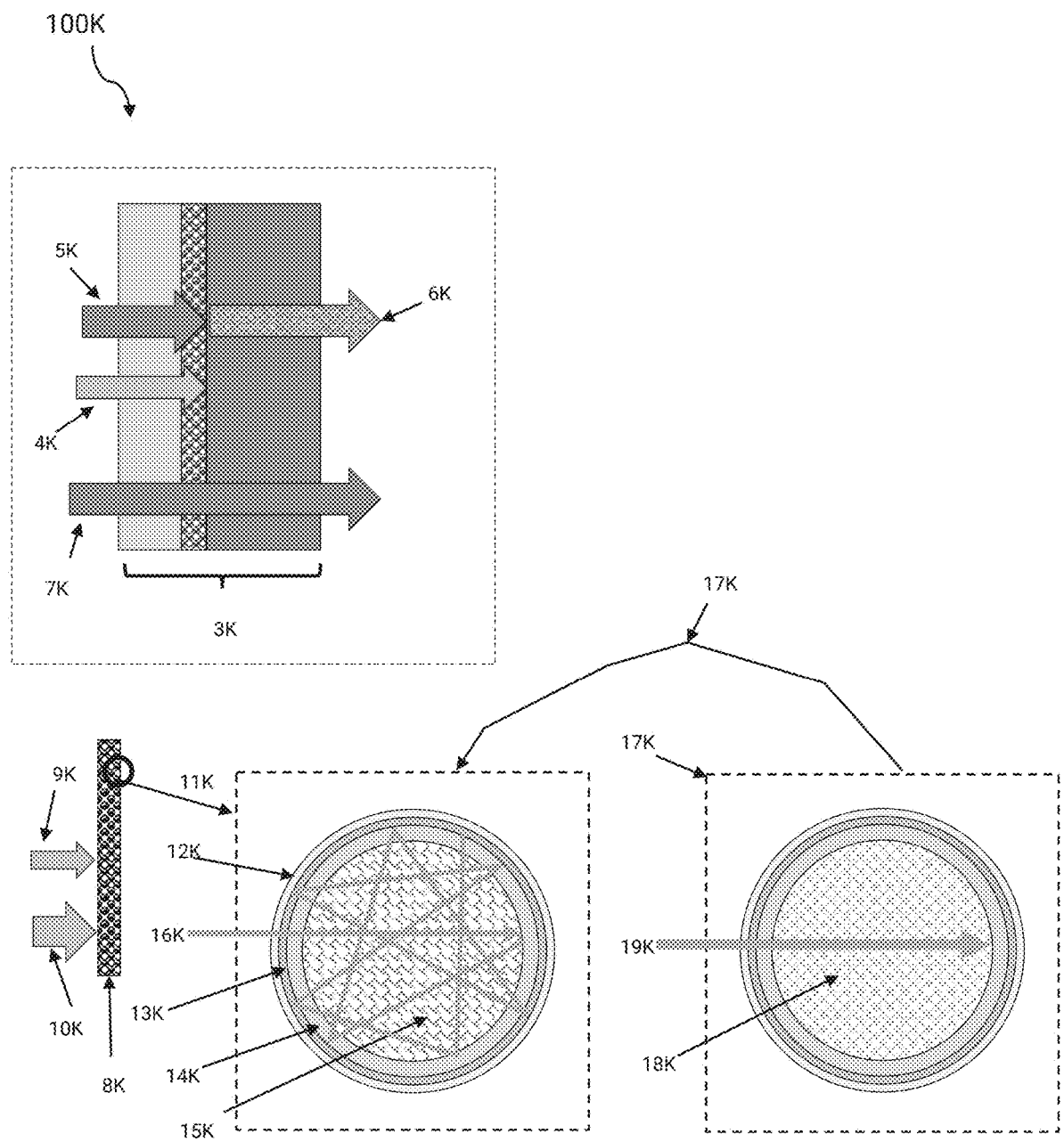
FIG. 1K illustrates a quantum dot resonance based phase change light valve.

FIG. 1K illustrates a quantum dot resonance based phase change light valve 100K. The QDR phase change-based LV 100K includes a QDR structure 3K. A patterned write beam 4K at wavelength λ1 enters the QDR and repeatedly interacts with the core of the QDs. The QD is resonant with λ1 but not λ2; the QD is also much smaller than λ2 so that the equivalent refractive index of the QD modifies the average refractive index that λ2 experiences. The unpatterned high fluence beam 5K at wavelength λ2 is modified depending on the intensity and duration of the write beam. If the write beam is of sufficient beam qualities as to permit a phase change in the QD's core, the high fluence beam is modified and the write beam image is transferred to the high fluence beam in the form of a polarization change allowing the high fluence beam leaving the QDR patterned 6K. In the case where the write beam has not altered the QD's core, the high fluence beam retains its original polarization.

Detail of the QDR-phase change LV is shown in 8K, 11K, and 17K. The core of the QDs are composed of materials that can exist in two states, crystalline/polycrystalline or amorphous. These two states have very different effects on polarized light. The crystalline state is birefringent and will modify the polarization of the high fluence beam while the amorphous state is not birefringent and has no effect on the polarization state of the high fluence beam. The shell structure of the QD contains a pre-cursor to the crystalline state of the core and is not affected/absorptive at the write beam's wavelength (λ1) while the core is affected and absorptive at λ1, the write beam will pass through the core multiple times and if it is of high enough fluence will cause the core to undergo a phase change from crystalline to amorphous. Alternatively, one of the shells surrounding the core could be the control layer while the core contains the crystalline-amorphous material, The shell heats up sufficiently to cause the outer volume of the core to undergo a phase change, leaving the center of the core to be in a crystallin state and thus act as a seed structure for a reversal to a crystalline state.

A patterned write beam 9K of intensity I1, with duration of time T1 (also known a pulse width), a repetition rate of K1, and at wavelength λ1, enters the QD layer 10K within the QDR. The QDs 11K in the QDR will react to the write beam if this beam has high enough fluence (=time*intensity). The QD detail in 11K is composed of an outer shell 12K, an intermediate shell 13K, and an inner shell 14K. These shells are used to enhance the resonance at λ1 and permit the write beam to interact with core 15K and the control structure within the QD to permit a phase change to occur from crystalline to amorphous or amorphous to crystalline. A portion of the write beam 16K enters the QD and interacts with the core and its cladding shells multiple time (depending on resonance quality function, Q). The write beam causes a material phase change of all or a portion of the core from a crystalline state to an amorphous state 17K and 18K. The high fluence beam will undergo a polarization change in regions of the QDR where the write beam is absent and no change to the high fluence's polarization state in regions where the write beam has been applied. A reset beam 19K) of λ1 with a longer pulse width (T2), a lower intensity (I2), and a variable repetition rate K2 enters into the QD and reacts to the core or the control layer and slowly heats up the core to just pass its glass transition temperature. The pre-cursor in the inner shell 14K or the portions of the central core containing the preferred crystalline template acts as a seed structure for the rest of the core. The variable repetition rate is structured to act as a heating and cooling ramp so that the core undergoes a phase change from amorphous to crystalline and resets the QD to a crystalline state. The high fluence beam's polarization changes from its original polarization state to one with a polarization shift due to the birefringence it experiences in passing though the QDR when it is once again in a crystalline form.

Figure 1L:
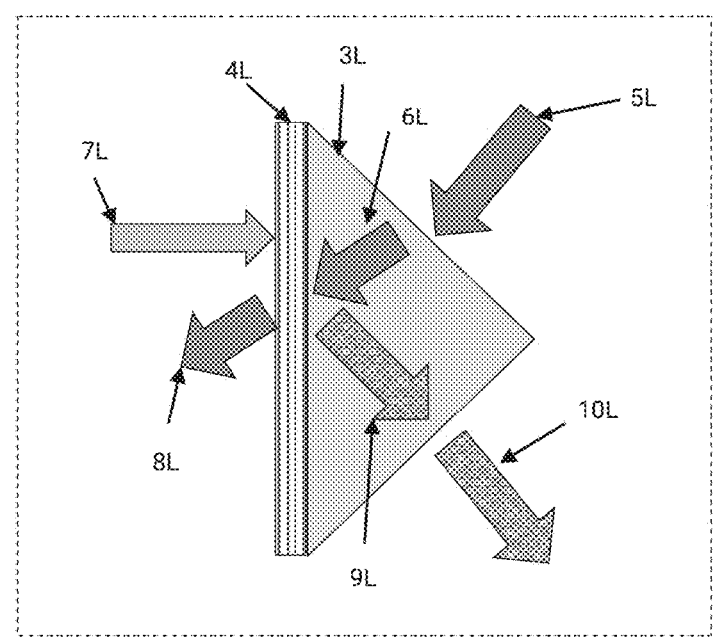
FIG. 1L illustrates total internal reflectance resonance based light valve.

FIG. 1L illustrates a total internal reflectance resonance based light valve (TIRrLV) 100L. A resonant based structure 4L is deposited/attached to a Total Internal Reflection (TIR) prism 3L. A high fluence beam 5L at λ2 enters the prism and refracts 6L. The entrance angle for the high fluence beam is such that the refracted beam inside the prism undergoes TIR dependent upon the equivalent refractive index of the resonator 4L at λ2. Since the resonator is resonant to the write beam 7L at wavelength λ1 and contains a control layer responsive to λ1, the refractive index of the resonator can be modified and thus allow or defeat the TIR condition for λ2.

A patterned write beam 7L enters the resonator 4L and modifies the control structure within the resonator, changing its refractive index in the waveband at λ2 that TIR condition is applied to the high fluence beam 6L and it undergoes TIR at the resonator 4L interface with the write beam pattern imprinted on it 9L. The patterned high fluence beam leaves the TIRrLV 10L and is imaged to the print bed. In regions where the write beam is not activated, the resonator refractive index does not support TIR and the unpatterned high fluence beam passes through the resonator 8L unaffected by the resonator.

FIGS. 1M(i) and 1M (ii) illustrate other embodiments of total internal reflectance resonance based light valves 100M. In one embodiment shown in FIG. M(i) a bulk prism 3M has been replaced by a prism array with the resonator 4M deposited o otherwise attached to the TIR interface of the array. The high fluence beam (5<) at λ2 enters set of prism elements and will undergo TIR at the resonator dependent on the state of the patterned write beam 6M at wavelength λ1 enters the resonator and affects its control layer. If the write beam does not modify the TIR condition (via refractive index modification of the TIR condition for λ2) then the high fluence beam passes through the TIRrLV 7M unaffected. If the write beam modifies the TIR condition to allow TIR, then the high fluence beam undergoes TIR and is patterned 8M and leaves the TIRrLV as a patterned high fluence beam.

In another illustrated embodiment illustrated in FIG. M(ii) a TIR prism array with thin film TIR reflector 10M with a resonator containing a control structure is shown. Both the resonator and control structure are responsive to λ1. The resonator and its control structure 11M are deposited or attached to a support substrate 12M. The thin film TIR film can be also deposited or attached to the resonator to make a monolithic and compact structure. The high fluence beam 13M enters into the thin film version of the TIRrLV and depending on the TIR condition dictated by the write beam 14M will either pass through the TiRrLV 15M or undergo TIR and leave the TIRrLV as a patterned high fluence beam 16M.

Figure 1N:
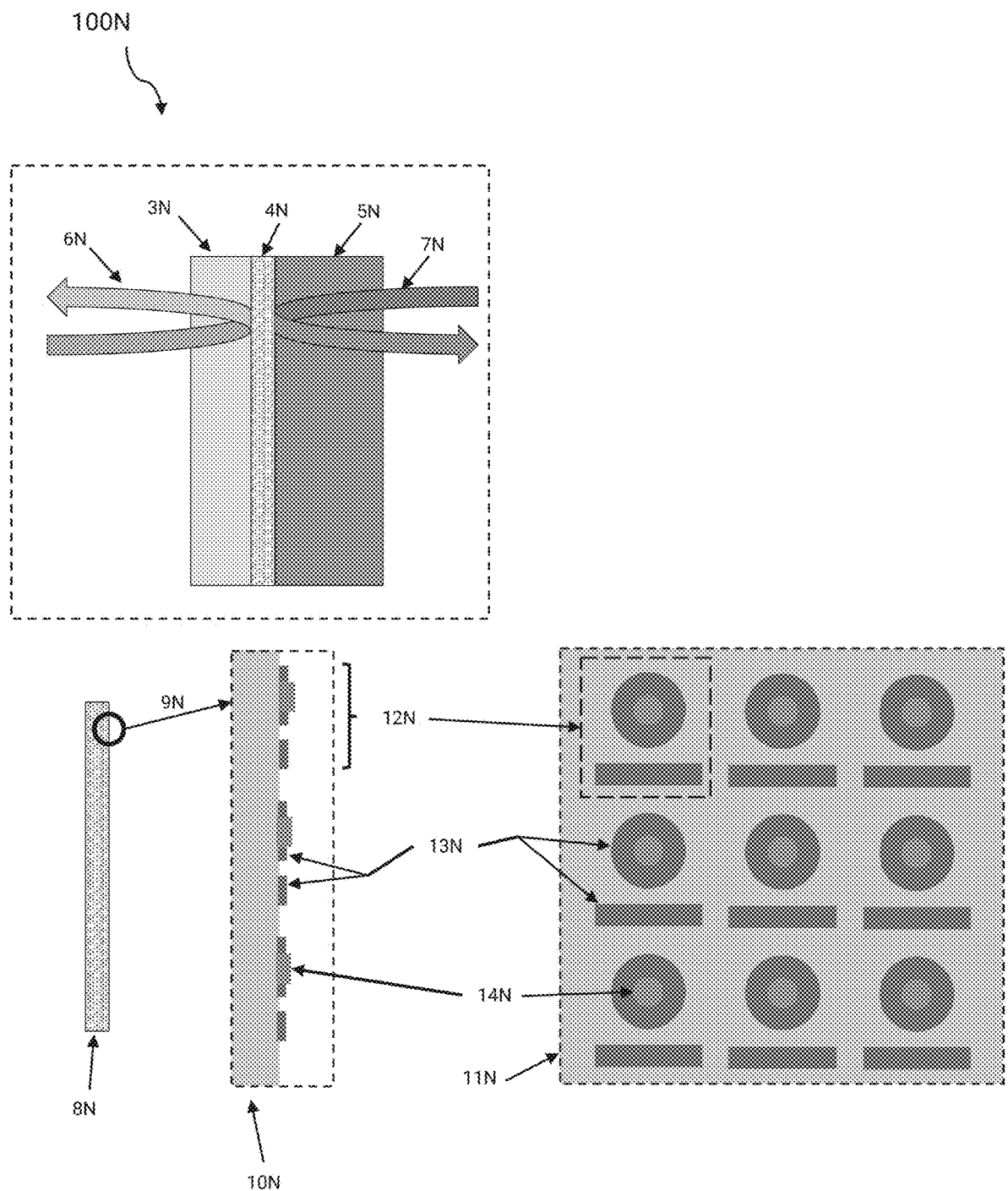
FIG. 1N illustrates a metamaterial resonance based light valve.
Figure 10:
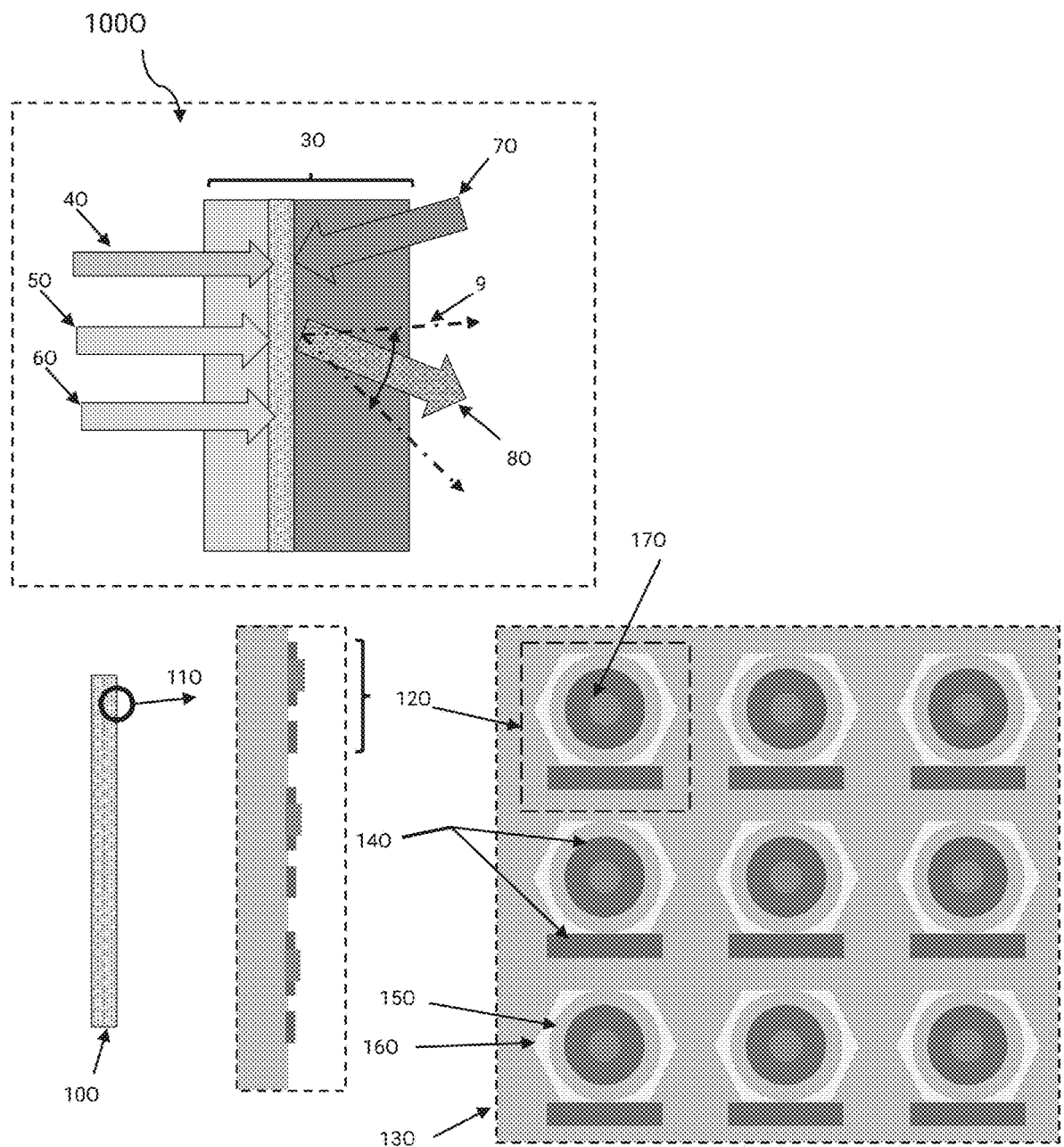

FIG. 1N illustrates a metamaterial resonance based light valve (MmrLV) 100N that includes a top supporting substrate 3N, a metamaterial resonant layer 4N, and a bottom supporting substrate 5N. A write beam 6N at λ1 enters the MmrLV and interacts with a control structure contained within the metamaterial resonant layer. The write beam modifies the complex impedance of the structure for the high fluence beam 7N at wavelength λ2 causing it to reflect off the MmrLV or pass through it with or without being affected (by design).

Also illustrated is metamaterial resonant layer 8N with 9N being more detail of the metamaterial layer side view while 11N is a plane view of an exemplary array of metamaterial resonators. Also shown is a support substrate 10N on which resonant structures are constructed. A unit cell 12N is shown to contain a basic building block or the array which is a combination of a resonator 13N and a control structure 14N. The resonant structure has a complex impedance that is resonance at λ2 depending on the action of the control structure which responds to only λ1. The array frequency (spacing between unit cells can also have a resonance to λ2 while the control structure could be just be responsive or both responsive and resonant to λ1.

The resonator 13N is one of many different shapes that the resonator can take, and the materials used in its construction can also be one of many types. Typical materials for these resonators include semiconductors (GaAs, AZO, CdS, doped Si to name a few), metal doped dielectrics (glassy metals, AZO, silver oxides, copper oxides), or nanoscopic metal encapsulated in dielectrics. The metamaterial is such that the complex impedance of the resonator allows for artificial adjustments to the electrical and magnetic circuit attributes of relative permittivity, resistivity, and permeability at λ2. The control element can modify coupling between any one of these circuit parameters to shift the resonator's response towards or away from λ2. Each of the resonator cell structures can be constructed to be small (<10%) of the λ2 and many cells contribute to the overall macroscopic complex impedance response that the high fluence beam at λ2 has to the metamaterial resonator array. What is important in relationship to high fluence systems is that the imaginary term of the complex impedance (which gives rise to absorptive loss) is kept to a minimum, so no heating effects occur. The control feature 14N needs to be responsive to λ1 only. In this example, is located as a Q (resonance quality factor) control by changing the coupling between these resonator basic elements, it can also be located and be shaped in a multitude of different shapes and be composed of many different material, on such being ZnSe or α-Si which will readily absorb in the UV but have less than 6 orders of magnitude different absorption at 1 um.

FIG. 1O illustrates another embodiment of a metamaterial resonance based light valve (MmrLV) 100O including MmrLV used as a solid-state scanner. Illustrated is a solid-state scanner structure 3O, a patterned write beam 4O at λ1, a scanner control beam 5O at λ3 for scan angle direction 1, a scanner control beam 6O at λ4 for scan angle direction 2, and a high fluence beam 7O at λ2. The high fluence beam's response to the MmrLV, when activated by the write and the two control beams, will be a patterned and 2D angle 9O scanned high fluence beam 8O (shown here as reflected variant, but a transmitted version can also be used).

The side view 10O is an exemplary of the metamaterial resonant layer while 11O is a detail side view of this layer consisting of an array 13O of basic resonator cells 12O. The basic metamaterial resonator cell includes a resonator 14O that is resonant at λ2, a directional control structure 15O that is responsive to λ3 or λ4, a directional control structure 16O that is responsive to λ4 or λ3, and a resonance coupling structure 17O that is responsive to λ1.

A wide range of lasers of various wavelengths can used in combination with the described resonance based light valve system. In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:$YVO_4$) laser, Neodymium doped yttrium calcium oxoborateNd:$YCa_4O(BO_3)^3$ or simply Nd:YCOB, Neodymium glass (Nd: Glass) laser, Titanium sapphire (Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride (Ce:LiSAF, Ce:LiCAF), Promethium 147 doped phosphate glass ($147Pm^{+3}$:Glass) solid-state laser, Chromium doped chrysoberyl (alexandrite) laser, Erbium doped anderbium-ytterbium co-doped glass lasers, Trivalent uranium doped calcium fluoride (U:$CaF_2$) solid-state laser, Divalent samarium doped calcium fluoride (Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

Figure 2:
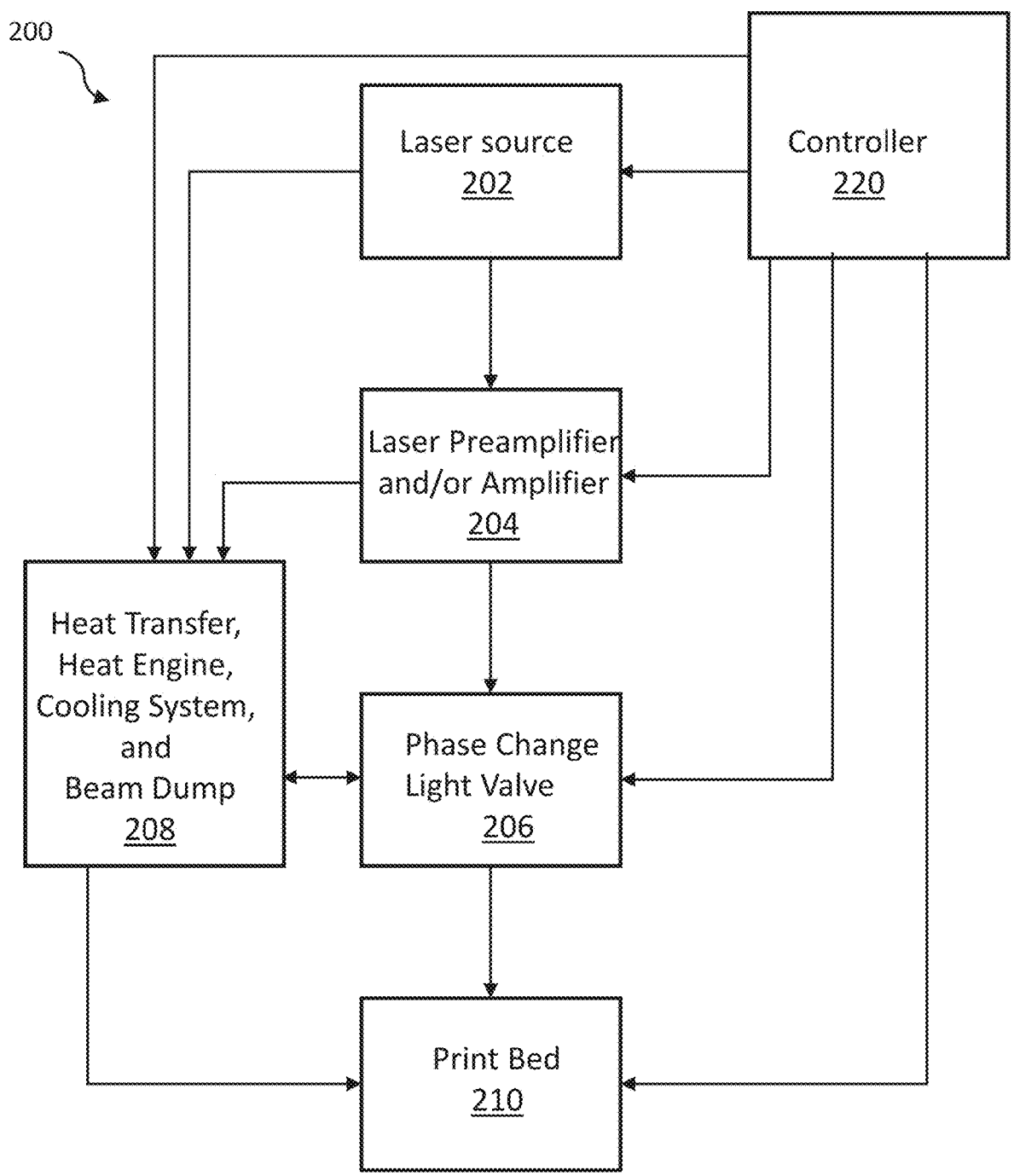
FIG. 2 illustrates a block diagram of a high fluence light valve based additive manufacturing system supporting a beam dump, a resonance based light valve, and a heat engine.

FIG. 2 illustrates use of a resonance based light valves such as disclosed herein in an additive manufacturing system 200. A laser source 202 directs a laser beam through a laser preamplifier and/or amplifier 204 into a resonance based light valve 206. After patterning, light can be directed into a print bed 210. In some embodiments, heat or laser energy from laser source 202, laser preamplifier and/or amplifier 204, or resonance based light valve 206 can be actively or passively transferred to a heat transfer, heat engine, cooling system, and beam dump 208. Overall operation of the light valve based additive manufacturing system 200 can controlled by one or more controllers 220 that can modify laser power and timing.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers will typically be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 204 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped. Both thermal energy and laser energy generated during operation can be directed the heat transfer, heat engine, cooling system, and beam dump 208.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, thermal energy and laser energy generated during operation of system 200 can be directed into the heat transfer, heat engine, cooling system, and beam dump 208. Alternatively, or in addition, in some embodiments the beam dump 208 can be a part of a heat transfer system to provide useful heat to other industrial processes. In still other embodiments, the heat can be used to power a heat engine suitable for generating mechanical, thermoelectric, or electric power. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
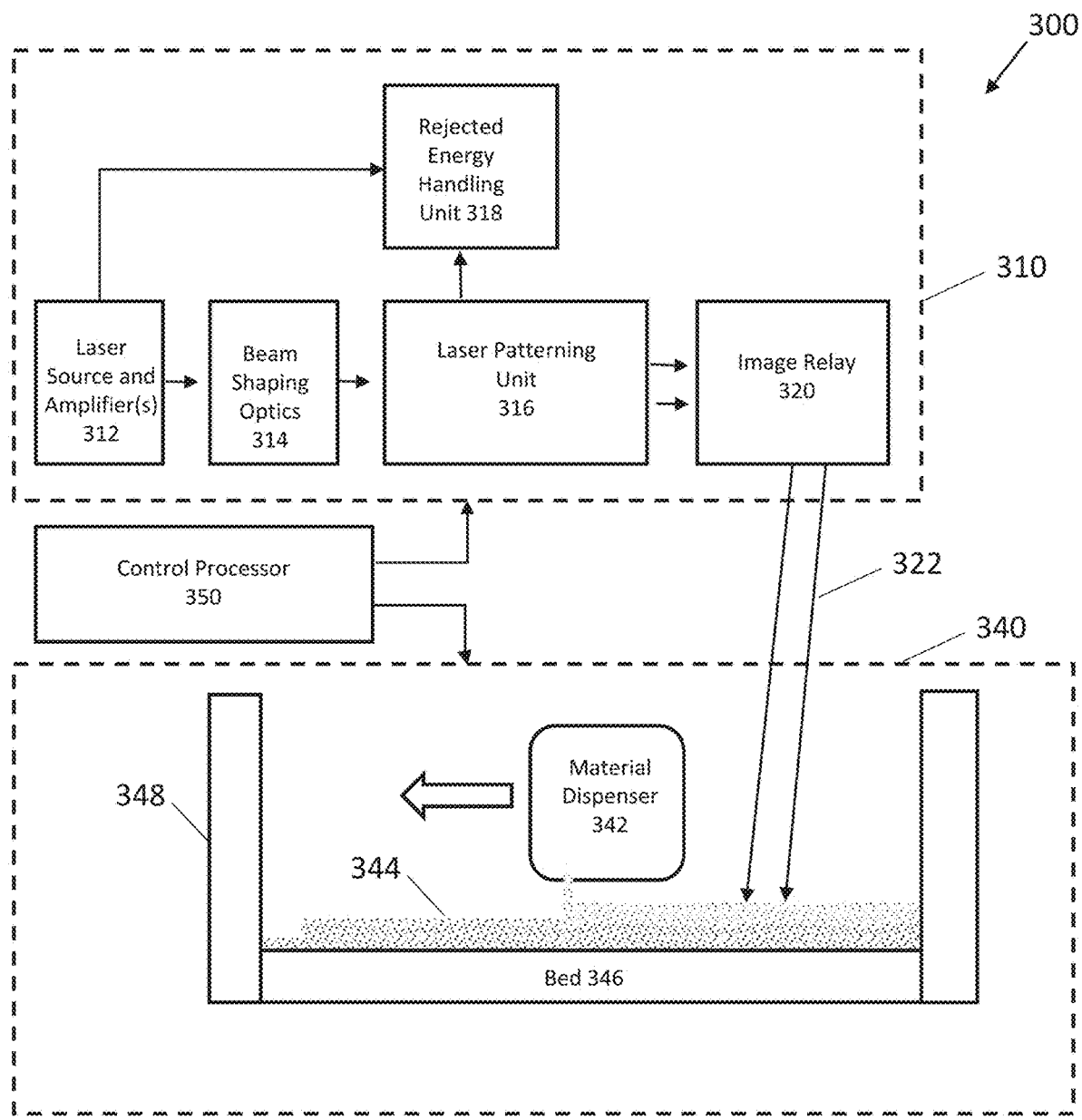
FIG. 3 illustrates a high fluence resonance based light valve based additive manufacturing system.

FIG. 3 illustrates an additive manufacturing system 300 that can accommodate resonance based light valves as described in this disclosure. As seen in FIG. 3, a laser source and amplifier(s) 312 can include resonance based light valves and laser amplifiers and other components such as previously described. As illustrated in FIG. 3, the additive manufacturing system 300 uses lasers able to provide one or two dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. The rejected energy handling unit can utilize heat provided by active of cooling of light valves such as discussed with respect to FIGS. 1A-1D.

Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source, light valve(s), and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system can be utilized in, for example and not limited to, laser-based additive manufacturing techniques where a mask is applied to the light. Advantageously, in various embodiments in accordance with the present disclosure, the thrown-away energy can be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$— $CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed can be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed can be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed can be collected in a hopper for reuse in later print jobs. The powder collecting process can be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) can be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system can maintain gaseous oxygen within the enclosure at concentrations below the atmospheric level. In some embodiments, a wheeled vehicle can transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection can be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
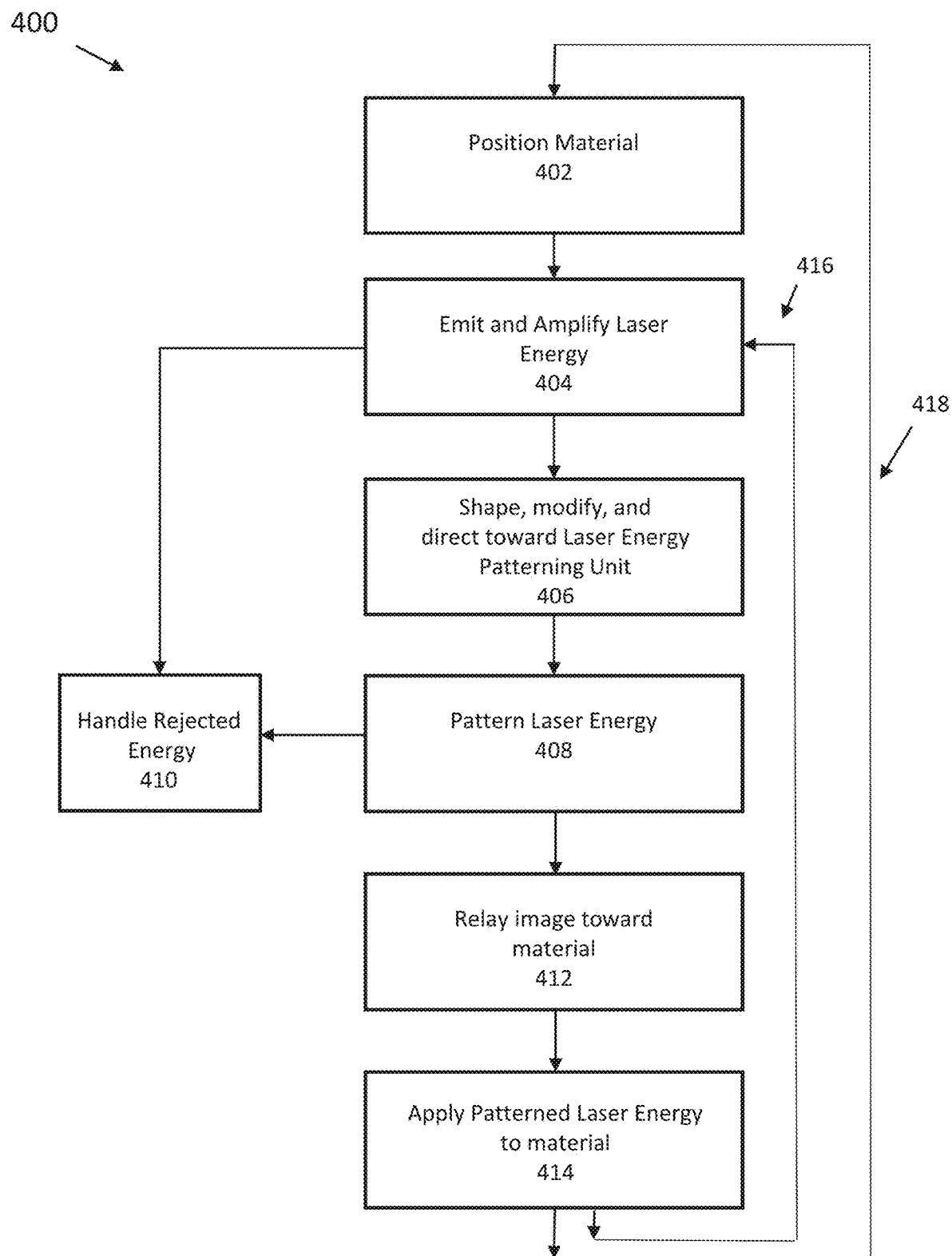
FIG. 4 illustrates another embodiment of a high fluence resonance based light valve based additive manufacturing system.

One embodiment of operation of a manufacturing system supporting use of a resonance based light valve suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned by a resonance based light valve, with energy not forming a part of the pattern being handled in step 410 (this can include use of a beam dump as disclosed with respect to FIG. 2 and FIG. 3 that provide conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

Figure 5:
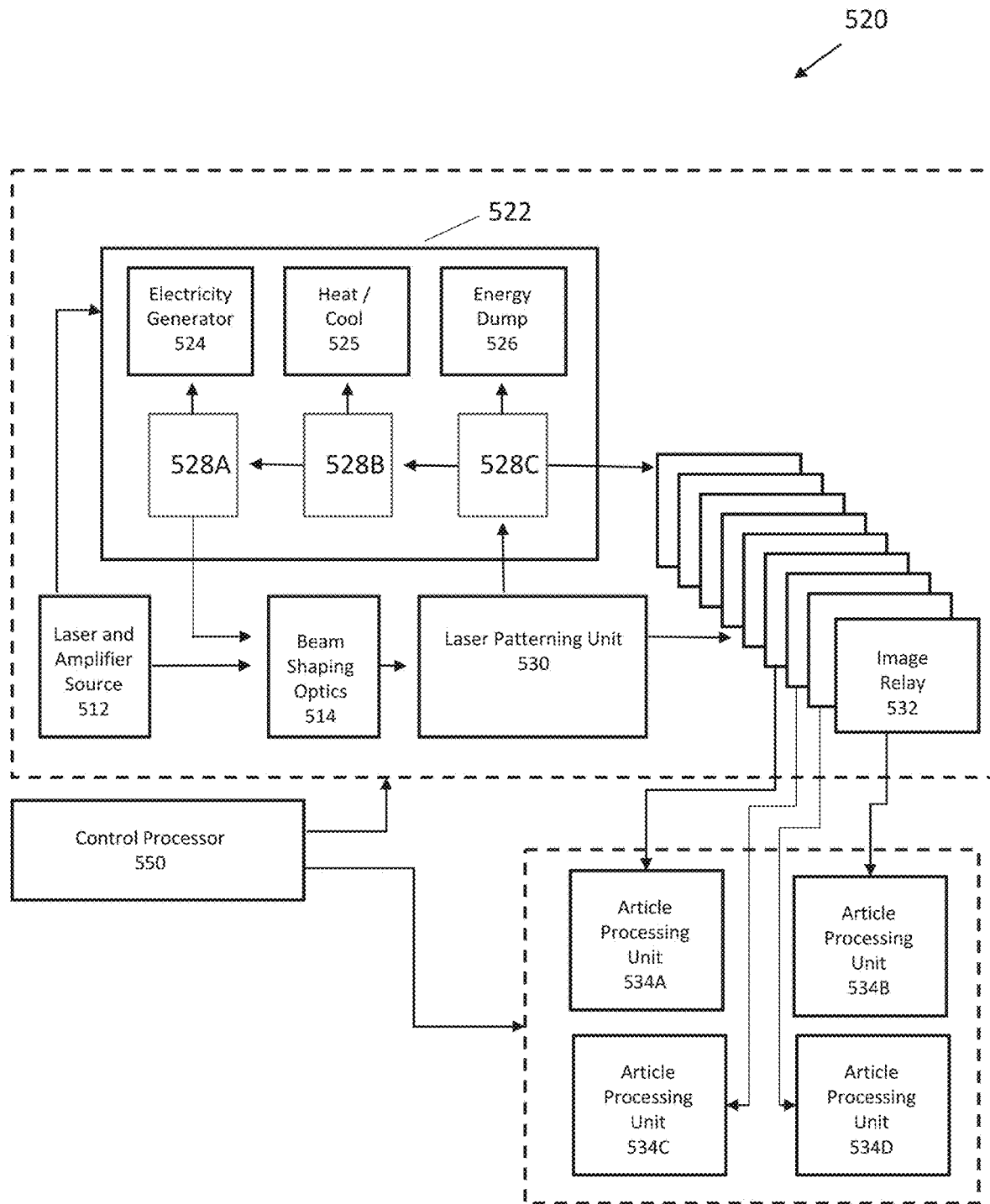
FIG. 5 illustrates another embodiment of a high fluence resonance based light valve based additive manufacturing which incorporates a switchyard approach for recovery and further usage of waste energy.

FIG. 5 is one embodiment of an additive manufacturing system that includes a resonance based light valve and a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system as disclosed with respect to FIGS. 1A-1D, FIG. 2, FIG. 3, and FIG. 4. After shaping, the beam is two-dimensionally patterned by an energy patterning unit 530 based on resonance based material, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed can be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units. 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention can be practiced in the absence of an element/step not specifically disclosed herein.

The invention claimed is:

1. An additive manufacturing system, comprising:
   a laser to form a laser beam at a first wavelength; and
   a 2D patternable light valve having a resonance based structure responsive to a write beam to pattern the laser beam based on a pattern of the write beam,
   wherein the resonance based structure includes an electro-optically activated control structure that imposes an activation of a control layer in a resonator of the resonance based structure, quantum dot materials, or metamaterials.

2. The additive manufacturing system of claim 1, wherein the laser beam undergoes a patterned phase delay across an area of the electro-optically activated control structure affected by the pattern of the write beam.

3. The additive manufacturing system of claim 1, wherein the electro-optically activated control structure is a phased array structure.

4. The additive manufacturing system of claim 1, wherein the laser beam is reflected in an area of the electro-optically activated control structure in which the write beam is not active.

5. The additive manufacturing system of claim 1, wherein the electro-optically activated control structure provides for non-mechanical beam steering of the laser beam.

6. The additive manufacturing system of claim 1, wherein the write beam causes the quantum dot materials to move out of resonance with the laser beam.

7. The additive manufacturing system of claim 1, wherein the resonance based structure includes total internal reflectance structures.

8. The additive manufacturing system of claim 1, wherein the write beam causes a phase change in the quantum dot materials that transfers the pattern of the write beam to the laser beam.

9. The additive manufacturing system of claim 1, wherein the metamaterials form a metamaterial resonator layer of the resonance based structure.

10. The additive manufacturing system of claim 1, wherein the 2D patternable light valve having a resonance based structure operates using total internal reflectance.

* * * * *